July 31, 1956  A. S. KOBAYASHI  2,756,614
GEARING UNIT
Filed Aug. 30, 1954  2 Sheets-Sheet 1

INVENTOR.
Albert S. Kobayashi
BY:
Olson & Trexler
Attys.

July 31, 1956 A. S. KOBAYASHI 2,756,614
GEARING UNIT
Filed Aug. 30, 1954 2 Sheets-Sheet 2
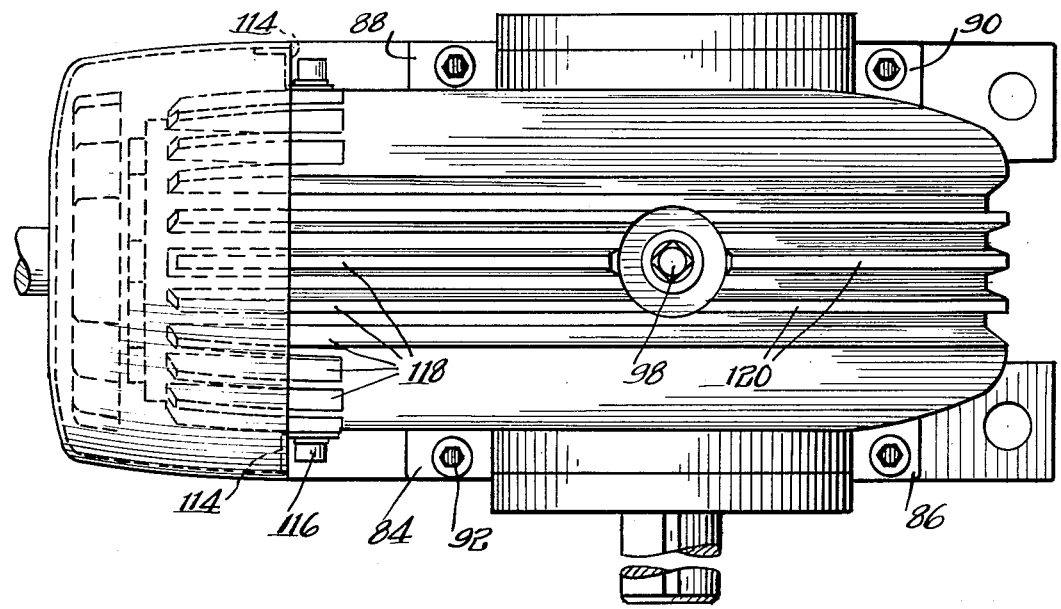
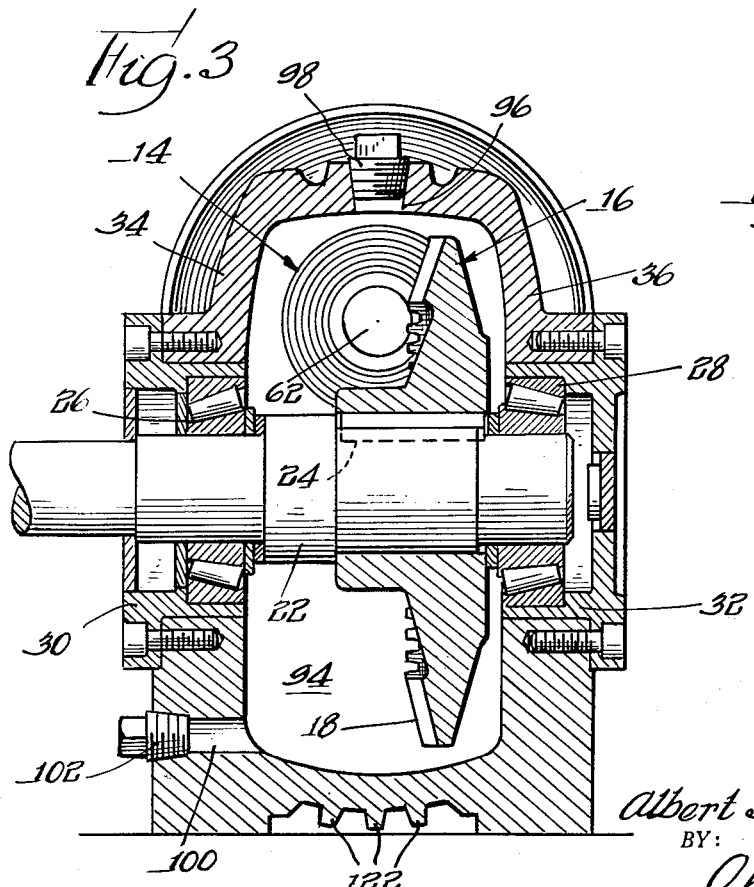
INVENTOR.
Albert S. Kobayashi
BY:
Olson & Trexler
Attys United States Patent Office 2,756,614
Patented July 31, 1956

2,756,614

GEARING UNIT

Albert S. Kobayashi, Chicago, Ill., assignor to Illinois Tool Works, Chicago, Ill., a corporation of Illinois Application August 30, 1954, Serial No. 452,857

5 Claims. (Cl. 74—606)

The present invention relates to a novel gearing unit and more particularly to a novel speed reduction gearing unit of the type including a worm, a worm gear and housing means in which the worm and worm gear are rotatably mounted.

Reduction gearing units now in general use are usually bulky and relatively heavy in weight as compared to their horsepower ratings. Such units are often relatively difficult to install, particularly when a limited space for installation is available, and the relatively great bulk and weight unduly increases manufacturing and shipping costs in view of the present invention.

An important object of the present invention is to provide a novel reduction gearing unit which is relatively compact and light in weight for a given horsepower rating whereby to facilitate assembly of the unit and to reduce manufacturing and shipping costs.

A more specific object of the present invention is to provide novel housing means for a speed reduction gearing unit, which housing means is of simple and economical construction and is relatively light weight and compact as compared to housing means heretofore used for reduction gearing units having a given horsepower rating.

A further object of the present invention is to provide a novel compact speed reduction gearing unit of the above described type which is air-cooled in a simple and efficient manner whereby to prevent overheating of the unit.

Other objects and advantages of the present invention will become apparent from the following description and the accompanying drawings wherein:

Fig. 3 is an enlarged plan view of the novel speed reduction gearing unit; and

Fig. 4 is a vertical cross sectional view taken along line 4—4 in Fig. 1.

Referring now more specifically to the drawings wherein like parts are designated by the same numerals throughout the various figures, a speed reduction gearing unit 10 includes housing means 12, a worm 14 and a worm gear 16.

Figure 1:
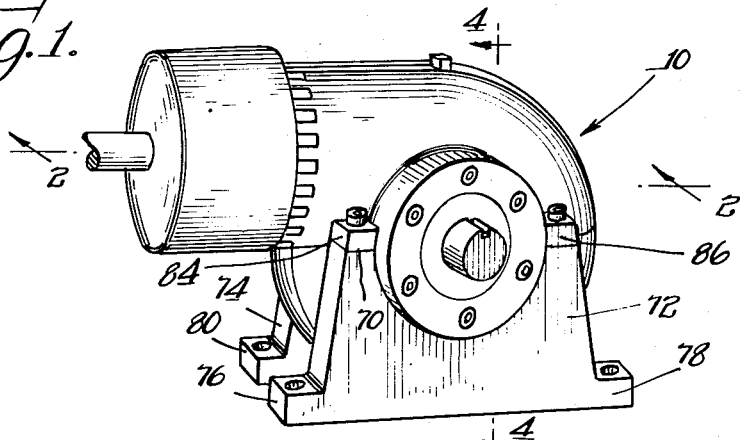
Fig. 1 is a perspective view showing a reduction gearing unit embodying the principles of this invention.
Figure 2:
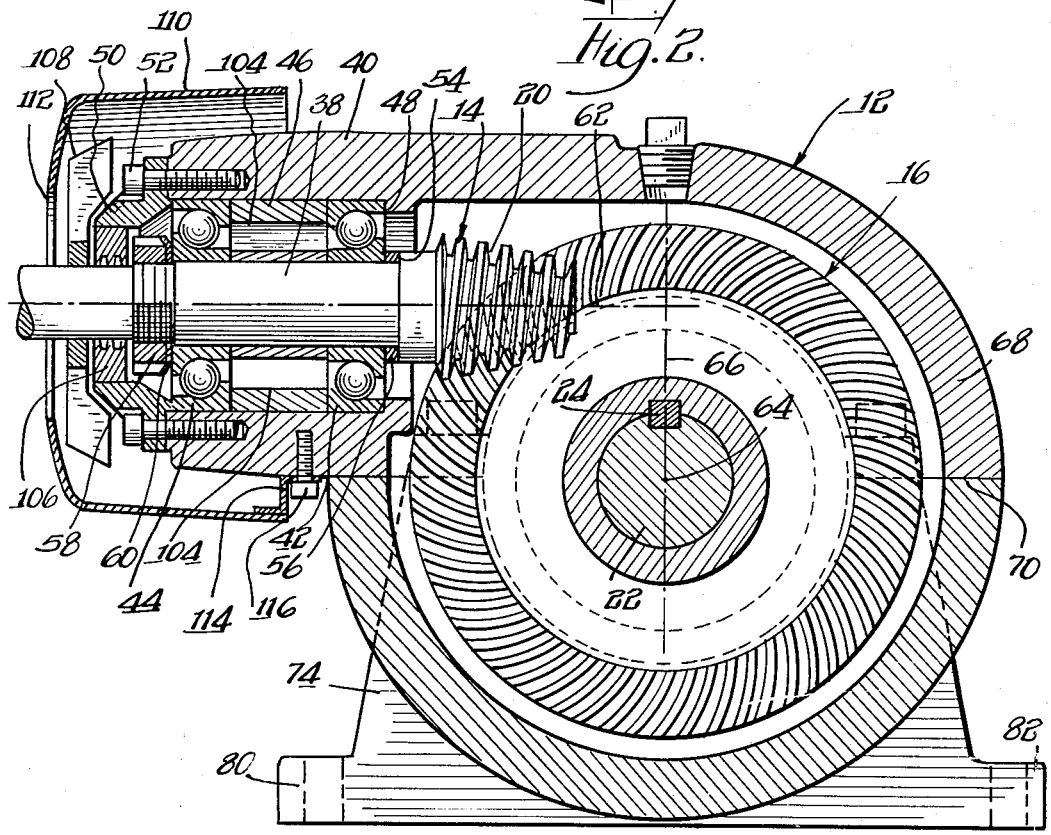
Fig. 2 is an enlarged sectional view taken along line 2—2 in Fig. 1.

As shown best in Figs. 2 and 4 the worm gear is a face-type gear having teeth 18 formed on a slightly beveled face thereof and the worm 14 is frusto-conical in shape and is provided with threads 20 adapted to mesh with the teeth 18. The gear 16 is mounted on a shaft 22 and fixed thereto by means such as a key 24. The shaft 22 is rotatably supported at opposite sides of the worm gear by bearing assemblies 26 and 28 of known construction, which bearing assemblies are respectively mounted in cap members 30 and 32 disposed within and covering suitable openings in opposite sides 34 and 36 of the housing means.

The worm 14 is fixed on or made integral with a rotatable shaft 38 which projects outwardly through a tubular laterally extending projection 40 of the housing. The shaft 38 is rotatably supported by a pair of anti-friction bearing assemblies 42 and 44 disposed within the tubular housing extension and spaced from one another by means of a member 46. In order to fix the worm against axial movement, the housing is provided with an internal annular shoulder 48 against which the outer race of the bearing assembly 42 abuts and the outer race of the bearing assembly 44 is clamped in position by means of a cap member 50 which is secured to the end of the tubular housing extension by a plurality of screws 52. It is to be noted that the ball races of the bearing assemblies 42 and 44 are formed so as to support thrust loads as well as radial loads. The shaft 38 is provided with an annular shoulder 54 adapted to cooperate with the inner race of the bearing assembly 42 and if desired a spacer member or shim 56 may be positioned between the shoulder 54 and the inner race of the bearing assembly 42. The shoulder 54 or the shim 56 is drawn and retained against the inner race of the bearing assembly 42 by means of a nut member 58 threaded onto the shaft 38 and adapted to clamp against the inner race of the bearing assembly 44. Preferably a suitable lock washer 60 is disposed between the nut member 58 and the inner race of the bearing assembly 44. With this structure it will be appreciated that the worm 14 may be readily axially adjusted merely by changing the thickness of the shim 56.

It should be noted that the distance between parallel planes containing the axes 62 and 64 of the worm and worm gear respectively is less than the radius of the worm gear, and more particularly it should be noted that the worm is constructed and arranged so that it does not extend beyond the periphery of the worm gear in a direction parallel to the line 66 which extends through the axis of the worm gear and perpendicularly to the axis of the worm. In order to make the worm and worm gear relatively strong and easy to manufacture and capable of withstanding greater loads than gears of similar sizes heretofore in general use, the worm and worm gear are preferably formed in the manner set forth in co-pending applications Ser. No. 411,145, and Ser. No. 442,553, respectively filed on November 30, 1953, and July 12, 1954, by Oliver E. Saari. Reference is hereby made to these copending applications for the details of the worm and worm gear structures and the manner in which worm and worm gear may be manufactured.

It should be noted, that in accordance with the present invention, the housing means 12 is provided with a generally circular peripheral wall section 68 which has an inner diameter similar to but slightly larger than the diameter of the worm gear. Furthermore, the upper wall portion of the tubular housing extension 40 merges with an upper portion of the circular wall section 68 and extends substantially tangentially to the arc defined by the inner surface of the circular wall. This formation of the housing 12 is to be distinguished from the relatively large generally rectangular housings now in general use for speed reduction gearing. More specifically, the housing means 12 is more compact than housing means now in general use for reduction gearing and the overall weight of the reduction gearing unit 10 with the housing means 12 formed in the manner just described will be not more than two-thirds of the overall weight of gearing units now in use having a similar horsepower rating.

It will be appreciated that the housing means 12 is of a simple shape and may be readily cast or molded in an economical manner. Preferably the housing means is cast in two parts, which parts are separated along the line 70. The lower part of the housing means is formed with thickened and laterally extending side portions 72 and 74, which side portions respectively include apertured feet 76—78 and 80—82 for mounting the gearing unit on a suitable base or piece of apparatus, not shown. The upper part of the housing is formed with integral laterally extending lugs 84, 86, 88 and 90, which lugs are adapted to overlie the thickened side portions 72 and 74 of the lower housing part and are provided with apertures for receiving screws 92 threaded into the lower housing part to retain the upper and lower housing parts together.

As shown best in Fig. 4 the worm gear 16 is preferably disposed toward one side of the housing so as to leave a substantial unobstructed chamber 94 within the housing adapted to contain a body of lubricating oil. An opening 96 is provided in the top of the housing through which lubricating oil may be introduced and suitable plug means 98 is provided for closing the opening. A drain opening 100 is provided adjacent the bottom of the housing, which opening is normally closed by a plug 102. As shown best in Fig. 2 lubricating oil may pass from the chamber 94 through the opening defined by the internal shoulder or flange 48 to lubricate the anti-friction bearing assembly 42. In addition, the spacing member 46 is provided with axially extending apertures 104 through which lubricating oil may pass to the bearing assembly 44. Oil is prevented from escaping out of the tubular extension of the housing by means of the cap 50 and a suitable sealing or packing member 106 disposed within the cap 50 and closely confining the worm shaft 38.

Since the housing 12 is relatively small for the horsepower rating of the unit, the exterior surface area of the housing is sometimes insufficient to insure that heat will be dissipated from the unit at a rate which will prevent overheating when the unit is being operated at its maximum capacity. Therefore, in accordance with the present invention, means has been provided to insure proper cooling of the unit. This means includes a fan blade 108 fixed on and rotatable with the worm shaft 38. A cover or cowl 110 having a relatively restricted opening 112 is disposed so that it encloses the fan and loosely encloses an outer end portion of the housing extension 40. Sheet metal brackets 114 are secured to and spaced circumferentially on the cowl for mounting the cowl on the housing. The brackets 114 have apertured end portions secured to the housing by means of screws 116. With this structure it is seen that upon rotation of the worm shaft 38 the fan 108 will function to draw air in through the cowl opening 112 and to force the air out of the opposite end of the cowl. The cowl functions to guide and direct the air around the cylindrical housing projection or extension 40 and then over the remainder of the housing. It should be noted that the flowing cooling air tends to follow the curved or rounded peripheral portion of the housing so as to promote cooling of the entire periphery of the housing. In order further to promote cooling of the housing, the housing extension 40 is provided with a plurality of circumferentially spaced cooling vanes 118 and the upper and lower housing parts are provided with vanes 120 and 122 which combine together to provide cooling vanes extending entirely around the circular peripheral wall portion of the housing.

From the above description it is seen that the present invention has provided a novel speed reduction gearing unit which is of simple and compact construction and which is substantially lighter in weight than speed reduction gearing units now in general use having similar horsepower ratings. Furthermore, it is seen that the present invention has provided simple and economical means for providing a positive flow of cooling air substantially entirely around the housing of the unit so as to insure proper cooling of the unit.

While the preferred embodiment of the present invention has been shown and described herein it is obvious that many structural details may be changed without departing from the spirit and scope of the appended claims.

The invention is claimed as follows:

1. A gearing unit comprising housing means, a face-type gear rotatably mounted within said housing means, said housing means having a peripheral generally circular wall section relatively closely surrounding the periphery of said gear, a worm shaft rotatably mounted within said housing means, a worm mounted on said shaft and meshing with said gear, said worm being disposed so that it is substantially entirely confined between planes perpendicular to a line extending through the axis of the gear and perpendicular to the axis of the worm and tangent to opposite points on the periphery of said gear, foot means engageable with a support extending from a side of said housing means and depending below said circular wall section to provide an air space between the circular wall section and the support, and means on said shaft for directing air over and under said circular wall section and through said air space.

2. A gearing unit comprising housing means, a face-type gear rotatably mounted within said housing means, said housing means having a peripheral generally circular wall section relatively closely confining said gear, said housing means having a hollow laterally extending portion including one wall section merging with and substantially tangent to said circular wall section, a shaft rotatably mounted within said laterally extending housing portion, a worm on an inner end of said shaft and meshing with said gear, said worm and said gear being disposed for rotation about axes lying in parallel planes spaced apart a distance less than the radius of said gear, and a fan mounted on a portion of said shaft disposed outwardly of said laterally extending housing portion for directing cooling air over said housing means, said laterally extending housing portion including an outer end having outside dimensions similar to outside dimensions of the remainder of said housing portion so as to promote flow of the cooling air along said entire housing portion and along said circular wall section.

3. A gearing unit comprising housing means, a face-type gear rotatably mounted within said housing means, said housing means having a peripheral generally circular wall section relatively closely surrounding the periphery of said gear, said housing having a hollow portion extending outwardly from said peripheral wall section, a shaft rotatably mounted within said hollow portion and extending outwardly therefrom, a worm on the inner end of said shaft and meshing with said gear, a fan fixed on a portion of said shaft disposed outwardly of said hollow housing portion for directing cooling air over said housing means upon rotation of said shaft, cowl means surrounding said fan for confining cooling air moved by said fan and further directing the cooling air over the housing means, and cooling vanes on said generally circular peripheral wall section and said hollow laterally extending housing portion, which vanes extend generally in the direction in which cooling air is directed over the housing means so as to promote movement of the cooling air substantially around said housing means.

4. A gearing unit comprising housing means, a face-type gear rotatably mounted within said housing means, said housing means having a peripheral generally circular wall section relatively closely surrounding the periphery of said gear, said housing means having a hollow portion extending outwardly from said peripheral wall section, a shaft rotatably mounted within said hollow housing portion and having an inner end disposed adjacent the periphery of said gear, a worm on said inner end of the shaft and meshing with said gear, said worm and said gear being rotatable about axes disposed in parallel planes spaced apart a distance less than the radius of said gear, said shaft having a portion extending outwardly from said hollow housing portion, and a fan fixed on said shaft portion adjacent said hollow housing portion for moving cooling air over said housing means upon rotation of said shaft.

5. A gearing unit, as defined in claim 4, which includes cowling means surrounding said fan and having a restricted air inlet opening through which said shaft extends, said cowling means extending in overlapped spaced relationship with said hollow housing portion and defining in cooperation with said hollow housing portion, an annular air outlet opening whereby to direct cooling air moved by said fan across and in contact with said housing means.

References Cited in the file of this patent

UNITED STATES PATENTS

| | | |
|---|---|---|
| 1,432,741 | Briggs | Oct. 24, 1922 |
| 2,147,391 | Acker | Feb. 14, 1939 |
| 2,693,244 | Rockwell et al. | Nov. 2, 1954 |